United States Patent [19]

Joe

[11] Patent Number: 5,798,893
[45] Date of Patent: Aug. 25, 1998

[54] HEAD DRUM ASSEMBLY FOR USE IN A VIDEO CASSETTE RECORDER

[75] Inventor: Yeo-Uk Joe, Seoul, Rep. of Korea

[73] Assignee: Daewoo Electronics Co., Ltd., Rep. of Korea

[21] Appl. No.: 757,708

[22] Filed: Nov. 27, 1996

[30] Foreign Application Priority Data

Nov. 28, 1995 [KR] Rep. of Korea ............... 1995 44376

[51] Int. Cl.$^6$ .......................... G11B 5/53; G11B 5/588
[52] U.S. Cl. ........................ 360/109; 360/75; 360/107
[58] Field of Search ....................... 360/75, 77.12, 360/77.16, 77.17, 77.13, 107, 109, 129

[56] References Cited

U.S. PATENT DOCUMENTS

| | | | |
|---|---|---|---|
| 4,151,569 | 4/1979 | Hathaway | 360/77.16 |
| 4,337,492 | 6/1982 | Brookhart et al. | 360/109 |
| 4,344,099 | 8/1982 | Kawachi et al. | 360/109 |
| 4,365,279 | 12/1982 | Kinjo | 360/109 |
| 4,446,497 | 5/1984 | Hirayama | 360/109 |
| 4,485,414 | 11/1984 | Baker | 360/10.3 |
| 4,710,828 | 12/1987 | Sulzer | 360/75 |

FOREIGN PATENT DOCUMENTS

| | | |
|---|---|---|
| 0 145 331 | 6/1985 | European Pat. Off. . |
| 0 713 211 | 5/1996 | European Pat. Off. . |
| 5-81631 | 4/1993 | Japan . |

*Primary Examiner*—Stuart S. Levy
*Assistant Examiner*—William J. Klimowicz
*Attorney, Agent, or Firm*—Pennie & Edmonds LLP

[57] ABSTRACT

A head drum assembly, for use in a video cassette recorder, comprises a rotary drum provided with a circumferential side wall and at least one opening provided thereon, a pair of heads each of which is provided with a head chip and a head base, a guide member for guiding the head base in a direction that is substantially parallel to the rotating shaft, and an electromagnet for moving the head in the direction parallel to the rotating shaft while the head chip is in contact with the magnetic tape. The rotary drum is held rotatable by a bracket. The heads are disposed 180° from each other on an inner bottom surface of the rotary drum, the head chip coming in contact with a magnetic tape partially wrapped around the rotary drum through the opening. The guide member is secured on the inner bottom surface of the rotary drum, guiding the head base in the direction parallel to the axis of the rotary drum. The electromagnet is curved along a path of rotation of the head base and is held stationary immediately above the guide member by a holder secured to the bracket, moving the head in the direction parallel to the axis of the rotary drum to allow the head chip to dynamically follow the track recorded on the magnetic tape.

2 Claims, 3 Drawing Sheets

HEAD DRUM ASSEMBLY FOR USE IN A VIDEO CASSETTE RECORDER

FIELD OF THE INVENTION

The present invention relates to a head drum assembly for use in a video cassette recorder ("VCR"); and, more particularly, to a head drum assembly provided with a stationary electromagnet, which is capable of allowing a head therein to dynamically follow along a track recorded on a magnetic tape.

DESCRIPTION OF THE PRIOR ART

In a VCR, information signals are typically recorded on a magnetic tape in discrete tracks of information. The magnetic tape is disposed around the periphery of a head drum and longitudinally transported relative thereto. One or more magnetic transducing heads rotate about the circumference of the drum. The tape follows a helical path around the drum so that the rotating head transcribes a path, or track, along the tape that is disposed at an angle relative to the longitudinal direction of the tape. As the tape is transported around the drum at a predetermined speed, successive adjacent tracks are formed on the tape at that angle. During playback, if the tape is transported around the drum at the same speed, the rotating head will successively read the tracks in the order in which they were recorded, under ideal conditions.

However, due to varied conditions such as stretching of the tape, differences in the normal speed between one machine and another, etc., the head may not be precisely positioned over a recorded track. As the location of the head moves away from the center of the track, the quality of the reproduced signal begins to degrade.

Accordingly, in order to faithfully reproduce individual tracks of information, it is necessary to move the head in a direction that is substantially transverse to its path of movement around the drum. In other words, the head must be moved in a direction that is parallel to the axis of the drum to enable it to remain adjacent to a particular track of recorded information.

Various techniques have, therefore, been developed to control the movement of the head in the direction parallel to the axis of the drum to maintain it substantially centered over the recorded track.

A conventional head drum assembly for use in a VCR, using one of the techniques, comprises an electro-magnetically driven actuator. The electro-magnetically driven actuator is mounted on an inner surface of a rotary drum fixed to a rotating shaft. The actuator rotates with the rotary drum, moving a head in a direction parallel to a rotating shaft in response to a voltage signal applied thereto, thereby allowing it to follow a track of information recorded on a magnetic tape. However, in such a conventional head drum assembly, since the actuator is rotated with the rotary drum, a brush and a slip-ring are required to supply the power to the actuator, thereby increasing the production cost thereof.

SUMMARY OF THE INVENTION

It is, therefore, a primary object of the present invention to provide a head drum assembly with a simpler structure, which is capable of allowing a head therein to dynamically move along a track of information recorded on a magnetic tape.

In accordance with the present invention, there is provided a head drum assembly for use in a video cassette recorder, the head drum assembly comprising: a rotary drum provided with a circumferential side wall and at least one opening provided thereon, the rotary drum being held rotatable by a bracket; at least one head provided with a head chip and a head base to which the head chip is attached, the head base being disposed on an inner bottom surface of the rotary drum, the head chip coming in contact with a magnetic tape partially wrapped around the rotary drum through the opening; means for guiding the head base in a direction that is substantially parallel to the axis of the rotary drum; and an electromagnet for moving the head in the direction parallel to the axis of the rotary drum while the head chip is in contact with the magnetic tape, the electromagnet being held stationary by a holder secured to the bracket.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
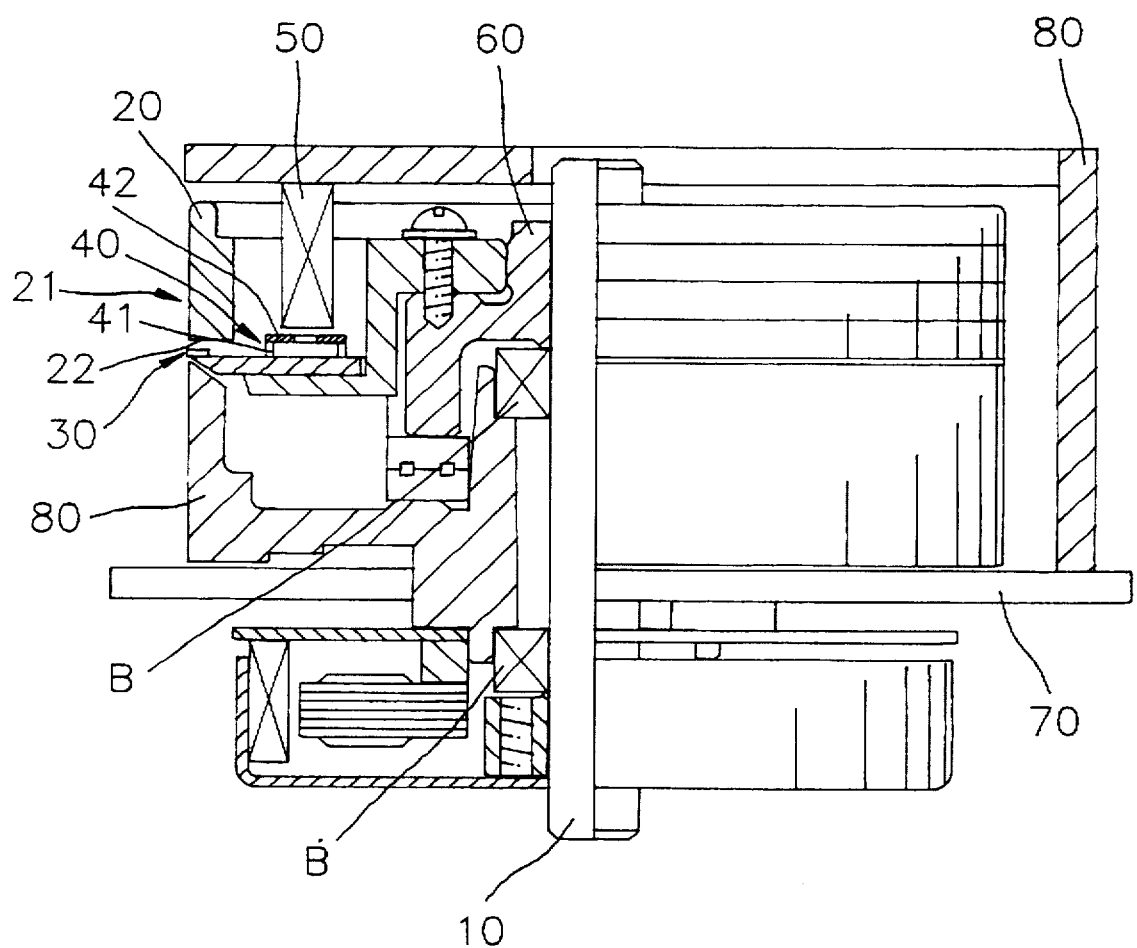
FIG. 1 represents a cross sectional view of the head drum assembly of the present invention.
Figure 2:
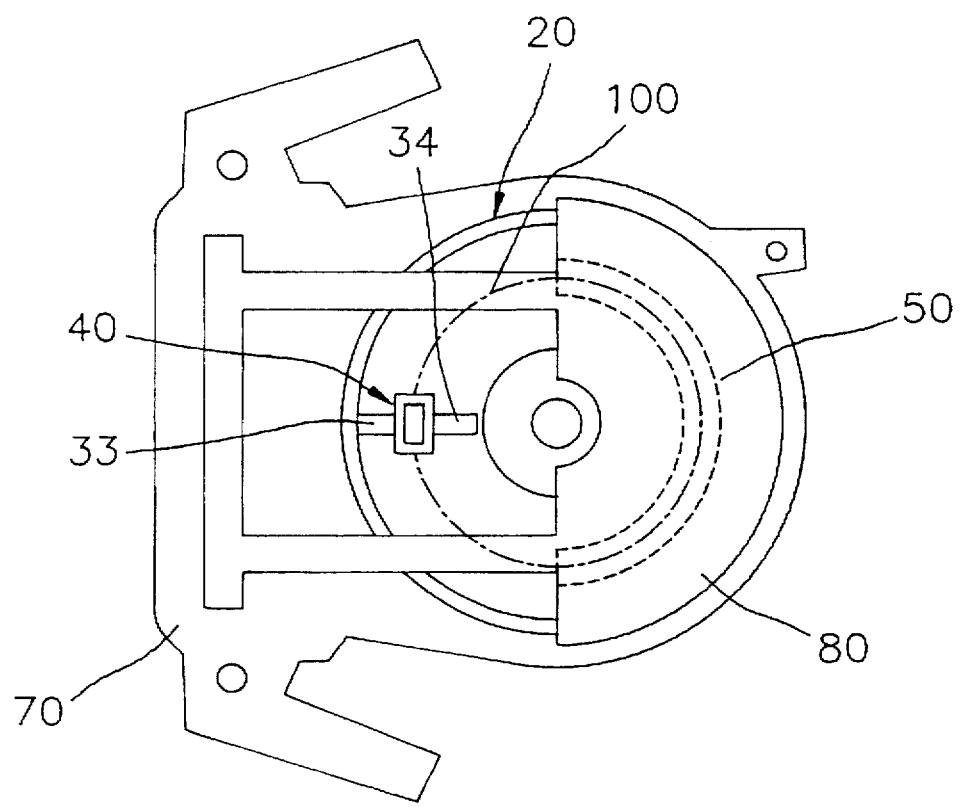
FIG. 2 depicts a top view of the head drum assembly in FIG. 1.
Figure 3:
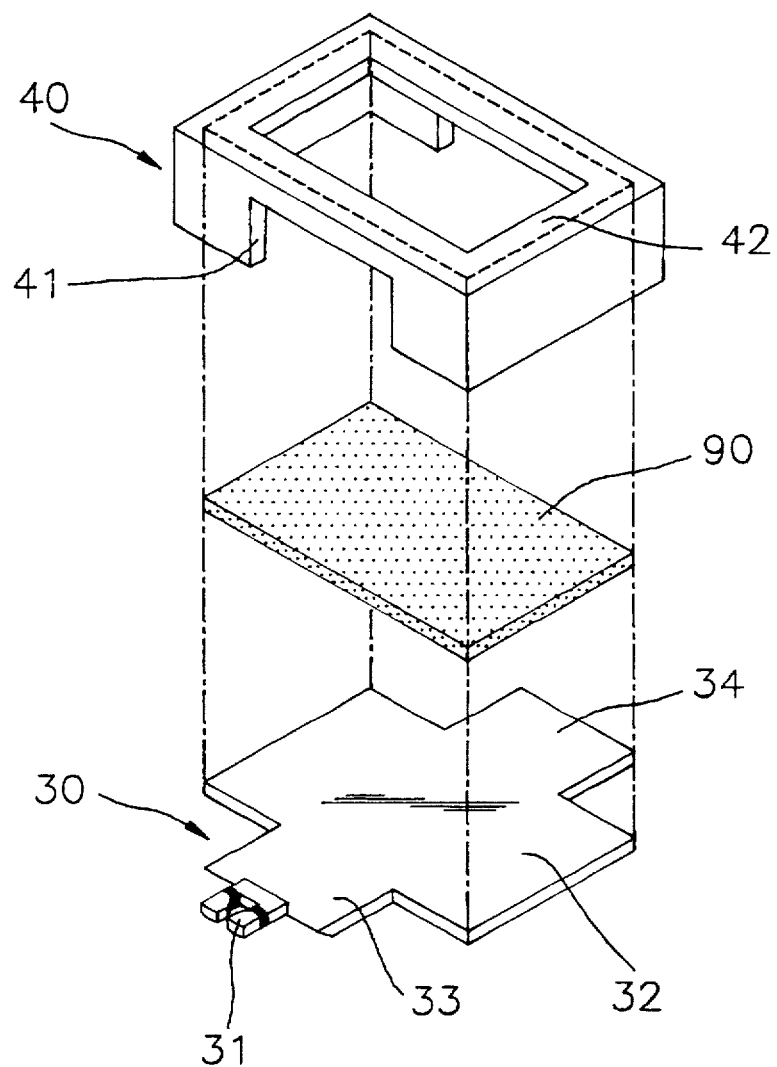
FIG. 3 illustrates an exploded perspective view of the guide member, the head and the elastic member of the present invention.

There is shown in FIGS. 1 to 3 various views of a head drum assembly in accordance with a preferred embodiment of the present invention. The inventive head drum assembly comprises a rotary drum 20, a pair of heads 30, a guide member 40 with a pair of cut-out portions 41 at opposite sides, and a stationary electromagnet 50.

The rotary drum 20 is provided with a circumferential side wall 21 and a pair of openings 22 provided thereon, being fixed onto a rotating shaft 10 through a flange 60. A bracket 70 holds the rotary drum 20 rotatable through, in turn, a stationary drum 80 and a set of bearings B. The bracket 70 is mounted to a deck (not shown) in such a way that the rotary drum 20 and the stationary drum 80 are inclined at an angle relative to a running direction of a magnetic tape (not shown).

The heads 30 are disposed 180° from each other on an inner bottom surface of the rotary drum 20. The head 30 is provided with a head chip 31 and a head base 32. The head base 32 has an extending portion 33 and a balance weight portion 34 protruding therefrom in opposite directions. The head chip 31 is attached on a leading end of the extending portion 33, coming in contact with the magnetic tape which is partially wrapped around the rotary drum 20 through the opening 22.

The guide member 40 is secured on the inner bottom surface of the rotary drum 20 in such a way that the extending portion 33 and the balance weight portion 34 pass through the cut-out portions 41, respectively. The guide member 40 guides the head base 32 in a direction that is substantially parallel to the axis of the rotary drum 20, i.e., the rotating shaft 10. The top edges of the cut-out portions 41 restrict the movement of the head 30. The guide member 40, and hence the head 30, rotates together with the rotary drum 20, forming a path of rotation 100.

The electromagnet 50 is curved along the rotation path 100 of the head base 32 and is held stationary immediately above the guide member 40 by a holder 80 which is mounted to the bracket 70 at one end. During playback, the electromagnet 50 moves one head 30 in the direction parallel to the rotating shaft 10 in response to a voltage signal applied thereto while the head chip 31 of the head 30 is in contact with the magnetic tape, thereby allowing the head chip 31 to dynamically follow the track recorded on the tape.

On the other hand, the guide member 40 may have a stopper 42 inwardly extending at top thereof and an elastic member 90 may be interposed between the stopper 42 and the head base 32. The elastic member 90 pressures the head base 32 against the rotary drum 20, preventing the head 30 from dithering while the electromagnet 50 is not energized.

In such a head drum assembly of the present invention, since the electromagnet 50 is held stationary, the brush and slip ring as seen in the prior art device is not required, making the structure thereof simpler, resulting in a reduction of the production cost thereof.

Although the invention has been shown and described with respect to the preferred embodiments, it will be understood by those skilled in the art that various changes and modifications may be made without departing from scope of the invention as defined in the following claims.

What is claimed is:

1. A head drum assembly for use in a video cassette recorder, the head drum assembly comprising:

a rotary drum provided with a circumferential side wall and at least one opening provided thereon, the rotary drum being held rotatable by a bracket;

at least one head provided with a head chip and a head base to which the head chip is attached, the head base being disposed on an inner bottom surface of the rotary drum, the head chip coming in contact with a magnetic tape partially wrapped around the rotary drum through the opening;

means for guiding the head base in a direction that is substantially parallel to the axis of the rotary drum; and an electromagnet for moving the head in the direction parallel to the axis of the rotary drum while the head chip is in contact with the magnetic tape, the electromagnet being held stationary by a holder secured to the bracket, wherein the head base has an extension portion and a balance weight portion protruding therefrom in opposite directions, and the head chip is attached to the extension portion, and the guiding means includes a guide member having a pair of cut-out portions at opposite sides and a stopper inwardly extending, the guide member being secured on the inner bottom surface in such a way that the extension portion and the balance weight portion pass through the cut-out portions, respectively, and an elastic member is disposed between the stopper and the head base, the elastic member pressuring the head base against the rotary drum to prevent the head from dithering while the electromagnet is not energized.

2. A head drum assembly for use in a video cassette recorder, the head drum assembly comprising:

a rotary drum provided with a circumferential side wall and at least one opening provided thereon, the rotary drum being held rotatable by a bracket;

at least one head provided with a head chip and a head base, the head base having an extension portion and a balance weight portion protruding therefrom in opposite directions and being disposed on an inner bottom surface of the rotary drum, the head chip being attached to the extension portion and coming in contact with a magnetic tape partially wrapped around the rotary drum through the opening;

a guide member for guiding the head base in a direction that is substantially parallel to the axis of the rotary drum, the guide member having a pair of cut-out portions at opposite sides and being secured on the inner bottom surface of the rotary drum in such a way that the extension portion and the balance weight portion pass through the cut-out portions, respectively, so that the top edges of the cut-out portions restrict the movement of the head base; and an electromagnet for moving the head in the direction parallel to the axis of the rotary drum while the head chip is in contact with the magnetic tape, the electromagnet being held stationary by a holder secured to the bracket.

* * * * *